US006379634B1

(12) United States Patent
Fields et al.

(10) Patent No.: US 6,379,634 B1
(45) Date of Patent: Apr. 30, 2002

(54) IONIC LIQUIDS AS SOLVENTS

(75) Inventors: Mark Fields; Graham Victor Hutson, both of Cumbria; Kenneth Richard Seddon, Belfast; Charles Mackintosh Gordon, Glasgow, all of (GB)

(73) Assignee: British Nuclear Fuels Plc (GB)

( * ) Notice: Subject to any disclaimer, the term of this patent is extended or adjusted under 35 U.S.C. 154(b) by 0 days.

(21) Appl. No.: 09/230,966

(22) PCT Filed: Aug. 1, 1997

(86) PCT No.: PCT/GB97/02057

§ 371 Date: Jul. 2, 1999

§ 102(e) Date: Jul. 2, 1999

(87) PCT Pub. No.: WO98/06106

PCT Pub. Date: Feb. 12, 1998

(30) Foreign Application Priority Data

Aug. 2, 1996 (GB) .............................. 9616264

(51) Int. Cl.$^7$ .......................... C22B 60/02; C22B 60/04
(52) U.S. Cl. .................. 423/4; 423/8; 423/9; 423/10; 423/251; 423/260; 423/261
(58) Field of Search ................ 423/3, 4, 8, 9, 423/10, 251, 260, 261

(56) References Cited

U.S. PATENT DOCUMENTS

| 3,981,960 | A |   | 9/1976 | Brambilla et al. ............. 423/5 |
| 4,201,690 | A | * | 5/1980 | Mills et al. |
| 4,686,019 | A | * | 8/1987 | Ryan et al. |
| 5,264,191 | A | * | 11/1993 | Nakao et al. |
| 5,686,052 | A | * | 11/1997 | Dancausse et al. |
| 5,855,809 | A | * | 1/1999 | Angell et al. |

FOREIGN PATENT DOCUMENTS

| WO | WO 95/21806 | 8/1995 | ............. C07C/2/68 |
| WO | WO 95/21871 | 8/1995 | ............. C08F/4/00 |
| WO | WO 95/21872 | 8/1995 | ............. C08F/4/52 |
| WO | WO 96/18459 | 6/1996 | ............. B01J/31/02 |
| WO | WO 96/32729 | 10/1996 | ............. G21C/19/48 |

OTHER PUBLICATIONS

Fujino et al.; Reaction of Lithium and Sodium Nitrates and Carbonates with Uranium Oxides, Journal of Nuclear Materials 116:157–165 (1983).

Lane; Quaternary Ammonium Nitrates. Part I. Preparation from Alkyl Nitrates and from αω–Polymethylene Dinitrates, J. Chem. Soc. 1172–1175 (1953).

Morgan et al.; Molten Salt Oxidation–Reduction Processes for Fuel Processing, ACS Division of Industrial and Engineering Chemistry at the ACS/CSJ Chemical Congress ($177^{th}$ ACS National Meeting), Honolulu, Hawaii, Apr. 3–5, 1979, 233–252.

Smith et al.; Brønsted Superacidity of HCl in a Liquid Chloraluminate $AlCl_3$–1–Ethyl–3–methyl–1 H–imidazolium Chloride, J. Am. Chem. Soc. 111: 525–530 (1989).

Wilkes et al.; Air and Water Stable 1–Ethyl–3–methylimidazolium Based Ionic Liquids, J. Chem. Soc., Chem. Commun., 965–967 (1992).

Heerman et al.; "Electrochemistry And Spectroscopy Of Uranium In Basic $AlCl^3$ + N–(n–BUTYL)Pyridinium Chloride Room Temperature Molten Salts," *J. Electroanal. Chem.* 193:289–294 (1985).

* cited by examiner

*Primary Examiner*—Steven P. Griffin
*Assistant Examiner*—Christina Ildebrando
(74) *Attorney, Agent, or Firm*—Myers Bigel Sibley & Sajovec

(57) ABSTRACT

A method of dissolving in an ionic liquid a metal in an initial oxidation state below its maximum oxidation state, characterized in that the ionic liquid reacts with the metal and oxidizes it to a higher oxidation state. The initial metal may be in the form of a compound thereof and may be irradiated nuclear fuel comprising $UO_2$ and/or $PuO_2$ as well as fission products. The ionic liquid typically is nitrate-based, for example a pyridinium or substituted imidazolium nitrate, and contains a Bronstead or Franklin acid to increase the oxidizing power of the nitrate. Suitable acids are $HNO_3$, $H_2SO_4$ and $[NO^+]$. Imidazolium nitrates and certain pyridinium nitrates form one aspect of the invention.

32 Claims, No Drawings

IONIC LIQUIDS AS SOLVENTS

This invention relates to the reprocessing of irradiated fuel, as well as to a method for dissolving metal oxides in ionic liquids and to novel products or compositions of matter comprising ionic liquids.

By way of example, the irradiated fuel may be that resulting from the use of a fuel assembly in a light water reactor (LWR). Reference will be made below to such fuel but it should be understood that the invention is not restricted to the reprocessing of any particular type of irradiated fuel.

The irradiated fuel from an LWR is located within a Zircaloy cladding which has become oxidised as a result of the irradiation. In the known PUREX process for reprocessing irradiated fuel, the first stage involves the shearing and chopping of the fuel rods so that the irradiated fuel itself can be dissolved in nitric acid.

Molten salts are known for their use as solvents and they have in fact been proposed for use in the reprocessing of irradiated fuels from LWRs. These molten salts are typically mixtures of salts which are liquid only at high temperatures and offer little advantage as solvents over aqueous or organic media.

Recently, a salt, mixtures of salts, or mixtures of components which produce salts, which melt below or just above room temperature have become known. (In the terms of this invention, a salt consists entirely of cationic and anionic species). Such liquids are known as "ionic liquids" although this term can be used for salts which melt at relatively high temperatures, including for example temperatures of up to 100° C. Common features of ionic liquids include a zero vapour pressure at room temperature, a high solvation capacity and a large liquid range (for instance, of the order of 300° C.).

Known ionic liquids include aluminium(III) chloride in combination with an imidazolium halide, a pyridinium halide or a phosphonium halide. Examples include 1-ethyl-3-methylimidazolium chloride, N-butylpyridinium chloride and tetrabutylphosphonium chloride. An example of a known ionic liquid system is a mixture of 1-ethyl-3-methylimidazolium chloride and aluminium(III) chloride.

E. S. Lane, J. Chem. Soc. (1953), 1172–1175 describes the preparation of certain alkylpyridinium nitrate ionic liquids, including sec-butylpyridinium nitrate. No use of the liquids is mentioned but reference is made to the pharmacological activity of decamethylenebis(pyridinium nitrate).

L. Heerman et al., J. Electroanal. Chem., 193,289 (1985) describe the dissolution of $UO_3$ in a system comprising N-butylpyridinium chloride and aluminium(III) chloride.

WO 96/32729 teaches that oxide nuclear fuels may be dissolved in a fused alkali metal carbonate to produce a compound which may be further processed so as to extract uranium therefrom.

WO 95/21871, WO 95/21872 and WO 95/21806 relate to ionic liquids and their use to catalyse hydrocarbon conversion reactions (e.g. polymerisation or oligomerisation of olefins) and alkylation reactions. The ionic liquids are preferably 1-($C_1$–$C_4$ alkyl)-3-($C_6$–$C_{30}$ alkyl) imidazolium chlorides and especially 1-methyl-3-$C_{10}$ alkyl-imidazolium chloride, or 1-hydrocarbyl pyridinium halides, where the hydrocarbyl group is for example ethyl, butyl or other alkyl.

The present invention provides in a first aspect the use of an ionic liquid containing an oxidant to dissolve a metal, optionally in the form of a compound thereof. The oxidant oxidises the metal to a higher oxidation state, which is normally more soluble in the ionic liquid than is the metal in its original oxidation state. More particularly there is provided a method of dissolving in an ionic liquid a metal in an initial oxidation state below its maximum oxidation state, characterised in that the ionic liquid reacts with the metal and oxidises it to a higher oxidation state.

As used herein, the term "metal" includes not only metallic elements in the (0) oxidation state but also metals in an oxidation state greater than zero, bonded to other elements, for example U(IV) and U(VI). Thus, the metal in its original oxidation state may comprise a metal compound, for example a metal oxide.

The metal preferably comprises uranium (typically as $UO_2$ and/or $U_3O_8$) or plutonium (typically as $PuO_2$), or both, and usually fission products. The $UO_2$ or $PuO_2$ is not directly dissolved in the oxidising ionic liquid but, rather, the oxide reacts with the ionic liquid to form an oxidised species which dissolves in the ionic liquid. Such preferred dissolution processes may be used in the reprocessing of an irradiated nuclear fuel. The invention also includes the use of the oxidising ionic liquid to dissolve other metal species, for example a zirconium alloy, which may be in the form of cladding of a nuclear fuel rod.

In another aspect, therefore, the invention provides a method of dissolving a metal in less than its maximum oxidation state in an ionic liquid, wherein one component of the ionic liquid is an oxidant to oxidise the metal to a higher oxidation state. The metal is typically in the form of an oxide thereof.

The invention further provides an ionic liquid comprising an agent to increase the oxidising power of the liquid, for example to make a non-oxidising liquid to be oxidising. Thus, the liquid will contain not just one anion and one cation but in addition another component which enhances the ability of the liquid to react to oxidise a substrate. In preferred embodiments, the liquid contains both the mildly oxidising anion [$NO_3$] and an acid, which may be a Bronsted or Franklin acid such as $HNO_3$, $H_2SO_4$ or [$NO^+$], e.g. from [NO][$BF_4$]. The acid makes the liquid more oxidisingly reactive towards various substrates, such as $UO_2$ and $PuO_2$, for example. Thus, the invention includes an ionic liquid capable of oxidising $UO_2$ to convert the uranium to U(VI), especially an ionic liquid which comprises nitrate anions and nitronium cations in concentrations sufficient to enable the liquid to react with $UO_2$ and oxidise the uranium to U(VI), the ionic liquid also containing tetrafluoro-borate(III) and an organic cation. A preferred product is an ionic liquid containing [$NO^+$], typically having been added to the liquid as [NO][$BF_4$].

The products described in the preceding paragraph may often be viewed in a notional sense as comprising an ionic liquid base to which has been added an agent to increase the oxidising reactivity of the liquid. The nature of the notional "base" ionic liquid is not critical to the invention but preferred liquids comprise nitrate anion and an organic cation, especially nitrogen heterocycles containing a quaternary nitrogen, such as pyridinium or substituted imidazolium ions, for example. Exemplary ionic liquids include 1-butylpyridinium nitrate, 1-octylpyridinium nitrate, 1-butyl-3-methylimidazolium nitrate, 1-hexyl-3-methylimidazolium nitrate and 1-octyl-3-methylimidazolium nitrate.

The invention provides in addition novel nitrate-based ionic liquids, including those containing imidazolium and phosphonium cations as well as those containing pyridinium cations other than such cations disclosed by E. S. Lane.

Particularly preferred and novel ionic liquids are 1-butylpyridinium nitrate and 1-octylpyridinium nitrate.

These products themselves, free from any oxidation enhancer, forms one aspect of the invention. To avoid ambiguity it should be stated that systematic names are used herein for individual compounds or moieties, i.e. "butyl" here refers to the group sometimes called n-butyl ($CH_3$—$CH_2$—$CH_2$—$CH_2$—).

The invention also includes ionic liquids which are compound mixtures of ionic liquids, for example ternary liquids, the constituent liquids of which can in combination achieve dissolution (typically by oxidising reaction) of inter alia selected substrates or substrate concentrations which the individual liquids cannot so achieve.

The invention includes further the use in a method for reprocessing an irradiated fuel of an ionic liquid to dissolve the fuel, as well as reprocessing methods which include the step of dissolving the fuel in an ionic liquid.

The present invention, therefore, relates to the use of ionic liquids as solvents, optionally after first serving as a reactive medium.

The Solvent

The solvent comprises an ionic liquid which usually contains an agent or species to make the solvent oxidisingly reactive to inter alia selected substrates, although this agent is not necessarily present in all aspects of the invention (as explained below under the heading "The Metal"). The agent may be an oxidant dissolved in a non-oxidising liquid or an auxiliary agent to increase the oxidising reactivity of another oxidising species. If the solvent contains nitrate ions, the agent increases the oxidising reactivity of the solvent beyond that which would be provided by the nitrate ions themselves; as described above such agents include Bronsted and Franklin acids.

The solvent may in principle comprise any ionic liquid but the liquid normally comprises nitrate anions.

The cation will in practice comprise one or more organic cations, especially nitrogen heterocycles containing quaternary nitrogen and more especially N-substituted pyridinium or N,N'-disubstituted imidazolium. The substituents are preferably hydrocarbyl and more preferably alkyl, which may be branched, for example. The hydrocarbyl (e.g. alkyl) groups usually contain from 1 to 18 carbon atoms and some usually from 1 to 8 carbon atoms.

The cation may therefore be a disubstituted imidazolium ion where the substituent groups take the form $C_nH_{2n+1}$ for $1 \leq n \leq 8$, and the substituent groups are linear or branched groups. In preferred disubstituted imidazolium ions one substituent has n=1, 2 or 3 (of which methyl is particularly preferred) and the other has n=4, 5, 6, 7 or 8 (of which octyl, hexyl and more particularly $C_4$ especially butyl are preferred). Linear groups are preferred. Alternatively, the cation might be a substituted pyridinium ion, where the substituent group also takes the form $C_nH_{2n+1}$ for $1 \leq n \leq 8$, and the substituent groups are linear or branched groups; suitable substituents include butyl, 2-(2-methyl)propyl, 2-butyl and octyl but straight chain alkyl, especially butyl, is preferred.

Of course, minor quantities of contaminants may be present, e.g. methyl imidazolium in 1-butyl-3-methyl imidazolium.

It will be appreciated from the above that the ionic liquids may be nitrate-based, i.e. have nitrate as anion. Ionic liquids comprising nitrate are new and included in the invention except for certain alkylpyridinium nitrates and polymethylenebis (pyridinium nitrate) compounds taught by Lane. Also novel is the use of nitrate-containing ionic liquids as a reactive medium or solvent. The ionic liquids of the invention comprise nitrate and a cation component which is not exclusively an alkylpyridinium nitrate or a polymethylenebis (pyridinium nitrate). However 1-butylpyridinium nitrate is a particularly preferred ionic liquid which is novel and is also included in the invention. Products comprising the new ionic liquids form an aspect of the invention.

The new nitrate-based ionic liquids may be prepared by mixing aqueous silver(I) nitrate together with an appropriate organic halide. By way of example, one such ionic liquid is prepared by mixing together solutions of aqueous silver(I) nitrate and 1-butyl-3-methylimidazolium chloride (bmim). Silver chloride is precipitated and the liquid 1-butyl-3-methylimidazolium nitrate is formed:

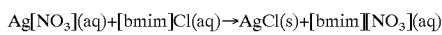

Ag[NO₃](aq)+[bmim]Cl(aq)→AgCl(s)+[bmim][NO₃](aq)

The product may be purified by filtration and removing excess water from the filtrate.

1-hexyl-3-methylimidazolium nitrate is prepared by a similar method and this material is also a liquid at room temperature.

Alternative cations to pyridinium and imidazolium include quaternary phosphonium cations, e.g. tetra (hydrocarbyl) phosphonium. Suitable hydrocarbyl groups are as described above in relation to pyridinium and imidazolium cations.

The agent to increase the oxidising power of the ionic liquid (when used—see below under the heading "The Metal") is typically a Bronsted acid (e.g. $HNO_3$ or $H_2SO_4$) or a Franklin acid, for example [$NO^+$], serving in either case to make nitrate more oxidisingly reactive towards substrates such as, for example, $UO_2$ and $PuO_2$. In other words, one class of ionic liquids of the invention contains an oxidant comprising nitrate and a promoter therefor. The oxidant when combined with the ionic liquid may react with the ionic liquid to create a new species which is also an ionic liquid. Thus, [NO][$BF_4$] is believed to react with the nitrate salts of organic cations to form the tetrafluoroborate(III) salt of the cation. An exemplary reaction is:

[Bu-py][NO₃]+[NO][BF₄]→N₂O₄+[Bu-py][BF₄]

wherein Bu-py is 1-butylpyridinium. [Bu-py][$BF_4$] is novel and included in the invention. The result of the reaction is a ternary ionic liquid. The invention includes the use of other compound ionic liquids.

The reaction of a tetrafluoroborate(III) salt and an ionic liquid results in an anhydrous tetrafluoroborate(III) product. The preparation of tetrafluoroborate(III) salts by such reactions is novel and included in the invention; such a preparative technique finds particular application in the making of organic tetrafluoroborate(III) salts, for example imidazolium, pyridinium and phosphonium salts.

Accordingly, the ionic liquid may comprise organic cations as described above and tetrafluoroborate(III) anions, e.g. be the tetrafluoroborate(III) salt of a quaternary nitrogen-containing heterocycle.

The Metal

The identity of the metal is not critical to the invention. In one aspect the metal prior to dissolution is in a relatively low oxidation state and the ionic liquid composition is oxidising. Preferably, the metal prior to dissolution is in a state less soluble in the ionic liquid than when it is in a higher oxidation state and the ionic liquid composition is oxidising. The metal is typically in the form of an oxide. Preferred metal oxides include a variety of oxides of uranium and plutonium(IV) oxide. Thus, by way of an example only, $UO_2$ may be reacted with an ionic liquid which oxidises the uranium(IV) species to uranium(VI) species, e.g. oxidises uranium dioxide to trans-dioxouranium(VI) in complexed form. Similarly, plutonium(IV), normally as $PuO_2$, may be reacted with an ionic liquid which oxidises the plutonium (IV) to plutonium(VI), e.g. oxidises plutonium dioxide to trans-dioxoplutonium(VI) in complexed form.

In one class of embodiments, the metal oxides comprise plutonium and uranium oxides, primarily in the form of irradiated nuclear fuel, for example an irradiated fuel rod. Nuclear fuel rods consist of fuel pellets contained in cladding and the invention contemplates that the cladding is removed by the oxidising ionic liquid. The cladding is usually a zirconium alloy, for example that sold under the trade mark Zircaloy. In another embodiment of this invention, therefore, the ionic liquid may be used to dissolve an elemental metal (which expression includes alloys), which may be cladding material or may be irradiated metal fuel, e.g. uranium metal which contains fission products and actinides and which started its life either as pure uranium metal or an alloy of uranium and at least one other metal.

In some aspects, the invention relates to ionic liquids which do not contain an acid or other oxidation promoter. Thus, nitrate-based ionic liquids without an additional acid may be used as a reactive medium or a solvent. For example, they may be used as a reactive medium to oxidise substances capable of oxidation by nitrate. A suitable oxide for dissolution in such nitrate-based solvents might include and thorium(IV) oxide.

The Method

The invention is not restricted as to the manner in which the metal is dissolved in the ionic liquid solvent. Normally, the dissolution is performed at an elevated temperature of 50° C. or more, e.g. of up to 350° C. Most preferably, the elevated temperature is from 50° C. to 100° C. The metal is normally dissolved with the aid of agitation, typically stirring.

The resultant solution may be further processed, for example for the selective removal of particular species. In particular, uranium and plutonium may be separated from each other by such selective removal techniques; alternatively, a mixed uranium/plutonium oxide may be separated from other components of the solution. Known electrodeposition techniques may be used to extract uranium and/or plutonium species from the solution, whereby fission products remain in solution and the solution may then be subjected to pyrohydrolysis to provide oxides ready for disposal. Other chemical processes may be used to provide a stable waste form for disposal. Alternatively, a method similar to the known PUREX process involving solvent extraction techniques may be used after the initial dissolution of the fuel in an ionic liquid. In this method, the fuel, and preferably the cladding, is dissolved in an ionic liquid and several extraction stages are carried out to remove fission products from the ionic liquid system and to separate the uranium product from the plutonium product ready for their subsequent reuse.

The invention preferably relates to the reprocessing of irradiated nuclear fuel. In one method, a fuel rod is placed in an oxidising ionic liquid and first cladding and then uranium and plutonium are dissolved in the ionic liquid. The uranium and optionally the plutonium are recycled into new fuel rods, e.g. by a method known per se, after being extracted from the ionic liquid. One class of methods includes the step of rupturing the cladding mechanically to expose the fuel pellets to the ionic liquid. In another method, the fuel rod is placed initially in a first ionic liquid for dissolving the cladding and subsequently in a second ionic liquid for dissolving the uranium and plutonium. The uranium and plutonium are normally as oxides thereof.

Those methods of the invention which concern the reprocessing of nuclear fuel may comprise performing one or more steps to process the dissolved fuel to form an intermediate or final nuclear fuel product, e.g. a gel, a powder, a pellet, a fuel rod or a fuel assembly.

The invention may be used in the reprocessing of any irradiated fuel, for example LWR, fast reactor and metal fuels. It may also be used to obtain purified dioxouranium (VI) nitrate from uranium ore or uranium ore concentrate ("yellow cake").

The invention is illustrated by the following Examples.

EXAMPLES

In the Examples, the following abbreviations are used:

| | |
|---|---|
| Bu | butyl |
| Hex | hexyl |
| mim | methylimidazolium |
| Oct | octyl |
| py | pyridinium |

$^1$H n.m.r Abbreviations

| | |
|---|---|
| s | singlet |
| d | doublet |
| t | triplet |
| quin | quintuplet |
| sex | sextuplet |
| m | multiplet |
| br | broad |

Example 1

Chemicals

Solid $UO_2$ from BNFL, $UO_2(NO_3)_2.6H_2O$ from BDH and nitronium tetrafluoroborate(III) ([NO][$BF_4$]) from Aldrich were all used as supplied. 1-Methylimidazole was distilled under vacuum and stored under dinitrogen prior to use. 1-Alkyl-3-methylimidazolium or 1-alkylpyridinium salts were prepared by direct reaction of the appropriate alkyl halide or haloalkane with 1-methylimidazole or pyridine, respectively, and recrystallised from ethanenitrile and ethyl ethanoate.

Spectra

UV-visible spectra were run in 1 mm pathlength cuvettes with quartz windows, referenced against a blank of the appropriate pure ionic liquid. Infrared spectra were recorded as thin films using NaCl plates.

Preparation of Nitrate Ionic Liquids

Nitrate ionic liquids were all prepared by methods analogous to the following method used to prepare 1-butyl-3-methylimidazolium nitrate.

1-butyl-3-methylimidazolium chloride (8.04 g, 46.0 mmol) was dissolved in water (15 cm$^3$). To this solution a solution of silver(I) nitrate (7.82 g, 46.0 mmol) in water (20 cm$^3$) was added. A white precipitate (possibly silver(I) chloride) formed immediately. The mixture was stirred (20 min) to ensure complete reaction, and was then filtered twice through a P3 sintered glass funnel to remove the white precipitate (the second filtration was generally necessary to remove the final traces of precipitate). The water was removed on a rotary evaporator, yielding a yellow or brown viscous liquid, sometimes containing small black solid particles. This crude product, 1-butyl-3-methylimidazolium nitrate, was dissolved in a small quantity of dry acetonitrile, and decolourising charcoal was added to the solution. This was then stirred (30 min) and filtered through Celite®. The acetonitrile was removed under vacuum, and the pale yellow ionic liquid product then dried by heating in vacuo (ca. 50° C., 2–3 d). Some discoloration of the product occurred if the heating was too vigorous. The resulting ionic liquid was stored under dinitrogen to exclude moisture.

The $^1$H n.m.r. spectra and microanalyses of the nitrate-based ionic liquids prepared following this procedure are shown below:

[Bu-mim][NO$_3$] (CDCl$_3$, 30° C.)

| Chemical shift, δ/ppm | Multiplicity | Integration | Proton identity (see figure) |
|---|---|---|---|
| 9.86 | s | 1H | 1 |
| 7.45 | s | 1H | 2 |
| 7.38 | s | 1H | 3 |
| 4.24 | t | 2H | 4 |
| 4.02 | s | 3H | 5 |
| 1.88 | quin | 2H | 6 |
| 1.37 | sex | 2H | 7 |
| 0.95 | t | 3H | 8 |

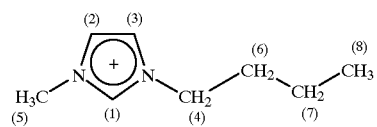

Microanalysis: % found (calculated value): C=45.60 (47.73); H=7.58 (7.52); N=20.04 (20.89).

[Hex-mim][NO$_3$] (CDCl$_3$, 30° C.)

| Chemical shift, δ/ppm | Multiplicity | Integration |
|---|---|---|
| 9.65 | s | 1H |
| 7.54 | s | 1H |
| 7.46 | s | 1H |
| 4.23 | t | 2H |
| 4.00 | s | 3H |
| 1.87 | quin | 2H |
| 1.29 | br | 6H |
| 0.86 | t | 3H |

The spectrum shows that the sample was also contaminated with 1-methylimidazole.

[Oct-mim][NO$_3$] (CDCl$_3$, 30° C.)

| Chemical shift, δ/ppm | Multiplicity | Integration |
|---|---|---|
| 9.79 | s | 1H |
| 7.56 | s | 1H |
| 7.46 | s | 1H |
| 4.26 | t | 2H |
| 4.01 | s | 3H |
| 1.89 | quin | 2H |
| 1.31 + 1.25 | br | 10H |
| 0.87 | t | 3H |

The spectrum also shows small traces of 1-methylimidazole.

[Bu-py][NO$_3$] (CDCl$_3$, 30° C.)

| Chemical shift, δ/ppm | Multiplicity | Integration | Proton identity (see figure) |
|---|---|---|---|
| 9.30 | d | 2H | 1 |
| 8.51 | t | 1H | 2 |
| 8.11 | t | 2H | 3 |
| 4.80 | t | 2H | 4 |
| 2.01 | quin | 2H | 5 |
| 1.39 | sex | 2H | 6 |
| 0.95 | t | 3H | 7 |

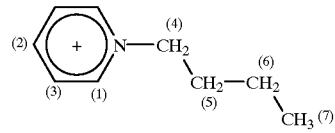

Microanalysis: % found (calculated value): C=50.56 (54.53); H=7.35 (7.12); N=13.50 (14.13).

[Oct-py][NO$_3$] (CDCl$_3$, 30° C.)

| Chemical shift, δ/ppm | Multiplicity | Integration |
|---|---|---|
| 9.27 | d | 2H |
| 8.50 | t | 1H |
| 8.11 | t | 2H |
| 4.78 | t | 2H |
| 2.02 | m | * |
| 1.32 + 1.23 | br | 10H |
| 0.85 | t | 3H |

*integration slightly incorrect due to overlap with signal from traces of CH$_3$CN.

[Oct-py][NO$_3$] (neat liquid, 30° C.)

| Chemical shift, δ/ppm | Multiplicity | Integration |
|---|---|---|
| 9.44 | d | 2H |
| 8.65 | t | 1H |
| 8.20 | t | 2H |
| 4.82 | br | 2H |
| 2.04 | s | * |
| 1.94 | br | 2H |
| 1.20 +1.12 + 0.99 | br | 10H |
| 0.60 | t | 3H |

* CH$_3$CN trace impurity, used as reference. Peaks generally broader than in CDCl$_3$ solution.

Example 2

Preparation of 1:10 [NO][BF$_4$]:[Bu-py][NO$_3$]

Nitronium tetrafluoroborate(III) (0.121 g, 1.03 mmol) was added to 1-butylpyridinium nitrate (2.258 g, 11.4 mmol) with stirring. A green colour was observed around the solid pieces of [NO][BF$_4$] on initial addition, although this colour disappeared when the mixture was stirred for two days. In addition, evolution of a brown gas was observed. Infrared spectral evidence demonstrated the removal of water from the ionic liquids by [NO][BF$_4$]

Example 3

Preparation of 1:2 [NO][BF$_4$]:[Bu-py][NO$_3$]

Nitronium tetrafluoroborate(III) (0.910 g, 7.8 mmol) was added to 1-butylpyridinium nitrate (3.000 g, 15.1 mmol) with stirring. Brown fumes were evolved immediately, and the solution rapidly turned dark blue/green. On stirring overnight all of the [NO][BF$_4$] dissolved to give a blue/ green solution which was much less viscous than the starting material, 1-butylpyridinium nitrate.

$^1$H n.m.r. (neat liquid, 30° C.)

| Chemical shift, δ/ppm | Multiplicity | Integration |
|---|---|---|
| 9.37 | d | 2H |
| 8.90 | t | 1H |
| 8.41 | t | 2H |
| 4.99 | t | 2H |
| 2.22 | br | 2H |
| 1.52 | sex | 2H |
| 1.04 | t | 3H |

Note that ppm values may be slightly incorrect due to lack of reference peak.

Example 4

Dissolution of $UO_2$ in 1:1 Nitrate Ionic Liquid: Nitric Acid Mixture

A 1:1 molar mixture of 1-butylpyridinium nitrate and concentrated nitric acid was prepared, as much excess water as possible being removed on a rotary evaporator. $UO_2$ (c.a. 0.01 g) was added to 0.5 cm$^3$ of this solution, and the mixture was first stirred (2 h) at room temperature with no sign of reaction. It was then heated (80 to 90° C., 6 h), during which time the solution turned yellow, with most of the $UO_2$ dissolved. The uv-visible spectrum of the product solution showed a band with fine structure centred at λ=438 nm which is indicative of the presence of a complexed form of the $[UO_2]^{2+}$ ion.

Example 5

Dissolution of $UO_2$ in 1:10 $[NO][BF_4]$:$[Bu$-$py][NO_3]$ $UO_2$ (0.02 g, 0.074 mmol) was added to the 1:10 $[NO][BF_4]$:$[Bu$-$py][NO_3]$ mixture (1.656 g). Stirring at room temperature resulted in no change in colour of the mixture (pale yellow), so the mixture was then heated (90° C., 5 h). At this stage most of the $UO_2$ had dissolved, and the solution was a more intense yellow colour. More $UO_2$ (0.101 g, 0.37 mmol) was added to the reaction mixture at this point, and heating continued (100° C., 48 h). At the end of this time a small amount of $UO_2$ remained undissolved, but the solution was an intense yellow colour. The uv-visible spectrum displayed a band with fine structure centred at λ=436 nm, indicative of the presence of a complexed $[UO_2]^{2+}$ ion. The solid residue from the reaction was collected, and weighed (0.018 g), indicating that a total of 0.103 g $UO_2$ (0.38 mmol) had reacted with the ionic liquid.

Example 6

Dissolution of $UO_2$ in 1:2 $[NO][BF_4]$:$[Bu$-$py][NO_3]$ $UO_2$ (0.059 g, 0.22 mmol) was added to a 1:2 $[NO][BF_4]$:$[Bu$-$py][NO_3]$ (2.45 g) under dinitrogen to exclude any water. The mixture was heated (ca. 65° C., 16 h), at the end of which all the black $UO_2$ had dissolved, giving a yellow solution. More $UO_2$ (0.140 g, 0.52 mmol) was added to the mixture, and the heating continued (ca. 65° C., 44 h). At the end of this time the solution was an intense yellow colour, but an as yet unmeasured amount of $UO_2$ remained undissolved. Once again the uv-visible and infrared spectra gave clear evidence for the presence of a complexed form of the $[UO_2]^{2+}$ ion.

What is claimed is:

1. A method of dissolving in a solvent a metal in an initial oxidation state below its maximum oxidation state, in which method the solvent reacts with the metal and oxidizes it to a higher oxidation state, wherein the solvent is an ionic liquid comprising an organic cation and has a melting point no greater than 100° C., and wherein the metal in its initial oxidation state is $UO_2$ or $PuO_2$, or a mixture thereof.

2. A method of claim 1 wherein the metal is more soluble in the ionic liquid when in its higher oxidation state than when in its initial oxidation state.

3. A method of claim 2 wherein the metal in its initial oxidation state is as an oxide.

4. A method of claim 1 wherein the ionic liquid contains nitrate ions.

5. A method of claim 4 wherein the ionic liquid further contains an acid.

6. A method of claim 5 wherein the acid is a Bronsted acid or a Franklyn acid.

7. A method of claim 6 wherein the acid is $HNO_3$, $H_2SO_4$, or $[NO^+]$.

8. A method of claim 7 wherein the ionic liquid containing $[NO^+]$ is obtainable by dissolving $[NO][BF_4]$ in an ionic liquid having nitrate anions.

9. A method of claim 1 wherein the cations of the ionic liquid are nitrogen heterocycles containing quaternary nitrogen.

10. A method of claim 1 wherein the dissolving step is performed at a temperature of from 50° C. to 100° C.

11. A method of claim 1, wherein the metal is contained in an irradiated fuel and which includes a step of reprocessing the irradiated fuel by dissolving the fuel in the ionic liquid, wherein the irradiated fuel is oxidized.

12. A method of claim 11 wherein the fuel and its cladding are dissolved together in the ionic liquid.

13. A method of claim 11 wherein a first ionic liquid is used to dissolve the fuels cladding and a second ionic liquid is used to dissolve the fuel itself.

14. A method of claim 11 wherein dissolved uranium is extracted from the ionic liquid by a solvent extraction or electrochemical method.

15. A method of claim 11 wherein the dissolving step is performed at a temperature of from 50° C. to 100° C.

16. A method of claim 11 further comprising processing the dissolved fuel to form a nuclear fuel product.

17. A method of dissolving in a solvent a metal in an initial oxidation state below its maximum oxidation state, in which method the solvent reacts with the metal and oxidizes it to a higher oxidation state, wherein the solvent is an ionic liquid comprising an organic cation and has a melting point no greater than 100° C., wherein said organic cation is a nitrogen heterocycle containing quaternary nitrogen and is a N-substituted pyridinium or N,N'-disubstituted imidazolium, and wherein the metal in its initial oxidation state is $UO_2$ or $PuO_2$, or a mixture thereof.

18. A method of claim 17 wherein the organic cation is a ($C_1$–$C_8$ alkyl) pyridinium or 1-($C_4$–$C_8$ alkyl)-3-methylimidazolium.

19. A method of claim 17 wherein the metal is more soluble in the ionic liquid when in its higher oxidation state than when in its initial oxidation state.

20. A method of claim 19 wherein the metal in its initial oxidation state is as an oxide.

21. A method of claim 17 wherein the ionic liquid contains nitrate ions.

22. A method of claim 17 wherein the ionic liquid further contains an acid.

23. A method of claim 22 wherein the acid is a Bronsted acid or a Franklyn acid.

24. A method of claim 23 wherein the acid is $HNO_3$, $H_2SO_4$, or $[NO^+]$.

25. A method of claim 24 wherein the ionic liquid containing [NO$^+$] is obtainable by dissolving [NO][BF$_4$] in an ionic liquid having nitrate anions.

26. A method of claim 17, which is performed at a temperature of from 50° C. to 100° C.

27. A method of claim 17, wherein the metal is contained in an irradiated fuel and which includes a step of reprocessing the irradiated fuel by dissolving the fuel in the ionic liquid, wherein the irradiated fuel is oxidized.

28. A method of claim 27 wherein the fuel and its cladding are dissolved together in the ionic liquid.

29. A method of claim 27 wherein a first ionic liquid is used to dissolve the fuels cladding and a second ionic liquid is used to dissolve the fuel itself.

30. A method of claim 27 wherein dissolved uranium is extracted from the ionic liquid by a solvent extraction or electrochemical method.

31. A method of claim 27 wherein the dissolving step is performed at a temperature of from 50° C. to 100° C.

32. A method of claim 27 further comprising processing the dissolved fuel to form a nuclear fuel product.

* * * * *